(12) United States Patent
Asanuma

(10) Patent No.: US 10,029,448 B2
(45) Date of Patent: Jul. 24, 2018

(54) LAMINATE

(71) Applicant: KURARAY CO., LTD., Kurashiki-shi (JP)

(72) Inventor: Yoshiaki Asanuma, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 176 days.

(21) Appl. No.: 14/892,915

(22) PCT Filed: May 22, 2013

(86) PCT No.: PCT/JP2013/064262
§ 371 (c)(1),
(2) Date: Nov. 20, 2015

(87) PCT Pub. No.: WO2014/188545
PCT Pub. Date: Nov. 27, 2014

(65) Prior Publication Data
US 2016/0167349 A1    Jun. 16, 2016

(51) Int. Cl.
| | |
|---|---|
| *B32B 27/08* | (2006.01) |
| *B32B 27/30* | (2006.01) |
| *B32B 27/22* | (2006.01) |
| *B32B 7/00* | (2006.01) |
| *B32B 7/02* | (2006.01) |
| *B32B 7/04* | (2006.01) |
| *B32B 7/10* | (2006.01) |
| *B32B 27/00* | (2006.01) |
| *B32B 27/06* | (2006.01) |
| *B32B 27/18* | (2006.01) |
| *B32B 27/28* | (2006.01) |
| *B32B 27/36* | (2006.01) |
| *B32B 17/10* | (2006.01) |

(52) U.S. Cl.
CPC ............... *B32B 27/22* (2013.01); *B32B 7/00* (2013.01); *B32B 7/02* (2013.01); *B32B 7/04* (2013.01); *B32B 7/10* (2013.01); *B32B 17/10761* (2013.01); *B32B 27/00* (2013.01); *B32B 27/06* (2013.01); *B32B 27/08* (2013.01); *B32B 27/18* (2013.01); *B32B 27/28* (2013.01); *B32B 27/30* (2013.01); *B32B 27/306* (2013.01); *B32B 27/36* (2013.01); *B32B 2250/00* (2013.01); *B32B 2250/02* (2013.01); *B32B 2250/03* (2013.01); *B32B 2307/102* (2013.01); *B32B 2307/40* (2013.01); *B32B 2307/412* (2013.01); *B32B 2307/50* (2013.01); *B32B 2307/732* (2013.01); *B32B 2551/00* (2013.01); *B32B 2605/00* (2013.01); *B32B 2605/006* (2013.01)

(58) Field of Classification Search
CPC ........ B32B 27/22; B32B 27/08; B32B 27/306
See application file for complete search history.

(56) References Cited

U.S. PATENT DOCUMENTS

| | | | |
|---|---|---|---|
| 2011/0192678 A1 | 8/2011 | Matsuda et al. | |
| 2011/0229714 A1* | 9/2011 | Morikawa | B32B 17/10036 428/328 |
| 2012/0288722 A1* | 11/2012 | Iwamoto | B32B 17/10036 428/437 |

FOREIGN PATENT DOCUMENTS

| | | |
|---|---|---|
| JP | 11-323055 A | 11/1999 |
| JP | 11-323056 A | 11/1999 |
| JP | 2007-321019 A | 12/2007 |
| JP | 2007-331959 A | 12/2007 |
| JP | 2011-011932 A | 1/2011 |
| WO | 2010/038801 A1 | 4/2010 |

OTHER PUBLICATIONS

International Search Report dated Jul. 9, 2013 for PCT/JP2013/064262 filed on May 22, 2013.
Extended European Search Report dated Oct. 28, 2016 in Patent Application No. 13885189.4.

* cited by examiner

*Primary Examiner* — Robert Harlan
(74) *Attorney, Agent, or Firm* — Oblon, McClelland, Maier & Neustadt, L.L.P.

(57) ABSTRACT

A laminate contains a layer A and a layer B. The layer A includes a polyvinyl acetal (A), a plasticizer (Ap), and a dispersant (Ad). The layer B includes a polyvinyl acetal (B) and a plasticizer (Bp) and optionally a dispersant (Bd). A mass ratio of (Ad) to (Ap) is larger than a mass ratio of (Bd) to (Bp). The plasticizer (Ap) and the plasticizer (Bp) are an ester compound of an m-valent alcohol with m molecules of a monovalent carboxylic acid having 8 to 16 carbon atoms, where m is a number of 2 to 4; and an ester compound of an n-valent alcohol with n molecules of a monovalent carboxylic acid having 8 to 16 carbon atoms, where n is a number of 2 to 4, respectively. The dispersant (Ad) and the dispersant (Bd) are obtained by hydrolyzing the plasticizer (Ap) and the plasticizer (Bp), respectively.

19 Claims, No Drawings

LAMINATE

TECHNICAL FIELD

The present invention relates to a laminate including a polyvinyl acetal.

BACKGROUND ART

A sheet including a polyvinyl acetal and a plasticizer has excellent adhesion to glass, transparency, mechanical strength, and flexibility, and therefore is widely used as an interlayer film for laminated glass.

In an interlayer film for laminated glass, having a high water content, bleeding (oozing) of a plasticizer may occur. In addition, in a case where the interlayer film is stored in a warehouse, etc., when the outside temperature is as high as 25° C. to 40° C., in summer, etc., the interlayer film may be deformed, or blocking between the interlayer films may easily occur at such a high temperature. Usually, the interlayer film is stored in a warehouse, etc. adjusted to a low temperature and a low humidity by an air-conditioning equipment, etc. so as not to cause bleeding of the plasticizer, deformation, or blocking.

However, when the interlayer film for laminated glass is stored, the inside of a warehouse may have a high temperature and a high humidity, for example, due to failure of an air-conditioning equipment, and the water content of the interlayer film for laminated glass may be significantly high. When the interlayer film for laminated glass having a high water content is left as it is, water or a plasticizer may cause phase separation in the interlayer film, or the plasticizer may bleed from a surface of the interlayer film to reduce transparency or mechanical characteristics of the interlayer film for laminated glass.

By the way, in recent years, as an interlayer film for laminated glass having sound insulation, a multilayer interlayer film for laminated glass has been examined. As the sound insulating interlayer film for laminated glass, a sound insulating multilayer interlayer film for laminated glass obtained by laminating a layer having a low content of a plasticizer for exhibiting mechanical strength or adhesion to glass and a layer having a high content of the plasticizer for exhibiting sound insulation, is used generally (refer to Patent Literatures 1 and 2).

When the multilayer interlayer film for laminated glass is stored for a long time while having a high water content, the water content becomes significantly high. Water or a plasticizer may cause phase separation in the interlayer film, or the plasticizer may bleed from a surface of the interlayer film. Therefore, it is necessary to dry such a multilayer interlayer film for laminated glass having a high water content in an atmosphere of a low temperature and a low humidity. However, when the multilayer interlayer film for laminated glass having a high water content is dried rapidly in the atmosphere of a low temperature and a low humidity, water or the plasticizer may cause phase separation from a polyvinyl acetal in the interlayer film to make the interlayer film opaque, or water or the plasticizer may bleed between layers of the interlayer film to cause interlayer peeling or reduction in transparency. In order to avoid these problems, drying may be performed while the temperature and the humidity are lowered gradually. However, there is a problem that it takes a long time for drying.

The interlayer film for laminated glass generally includes a plasticizer. The plasticizer may be extracted with water attached to a portion where the interlayer film is exposed at an end of the laminated glass, the glass may be peeled from the interlayer film, or air bubbles may be generated to damage the appearance of the laminated glass. In addition, in some types of plasticizers, a depressurizing step may be performed when laminated glass is manufactured, or a plasticizer may volatilize from an end of the laminated glass after use for a long time.

CITATION LIST

Patent Literatures

Patent Literature 1: JP 2007-331959 A
Patent Literature 2: WO 2010/038801 A

SUMMARY OF INVENTION

Technical Problem

The present invention solves the above-described problems. An object thereof is to provide a laminate in which a plasticizer is not easily extracted with water and does not easily volatilize, water or the plasticizer does not easily cause phase separation from a polyvinyl acetal even when the laminate having a high water content is rapidly dried in an atmosphere of a low temperature and a low humidity, and water or the plasticizer does not easily bleed between layers.

Solution to Problem

According to the present invention, the above-described object is suitably achieved by providing a laminate comprising a layer A including a polyvinyl acetal (A), a plasticizer (Ap), and a dispersant (Ad), and a layer B including a polyvinyl acetal (B) and a plasticizer (Bp) and optionally including a dispersant (Bd), wherein a mass ratio of a content of the dispersant (Ad) with respect to a content of the plasticizer (Ap) in the layer A is larger than a mass ratio of a content of the dispersant (Bd) with respect to a content of the plasticizer (Bp) in the layer B, the plasticizer (Ap) is an ester compound having a chemical structure obtained by an esterification reaction of one molecule of an m-valent alcohol (m represents a natural number of 2 to 4) with m molecules of a monovalent carboxylic acid having 8 to 16 carbon atoms, the dispersant (Ad) has a chemical structure obtained by hydrolyzing at least one ester bond of the plasticizer (Ap), and has (m−1) to 1 hydroxy groups and 1 to (m−1) ester bonds, the plasticizer (Bp) is an ester compound having a chemical structure obtained by an esterification reaction of one molecule of an n-valent alcohol (n represents a natural number of 2 to 4) with n molecules of a monovalent carboxylic acid having 8 to 16 carbon atoms, and the dispersant (Bd) has a chemical structure obtained by hydrolyzing at least one ester bond of the plasticizer (Bp), and has (n−1) to 1 hydroxy groups and 1 to (n−1) ester bonds.

The m-valent alcohol is preferably a condensate of ethylene glycol having a condensation degree of 3 to 20.

The n-valent alcohol is preferably a condensate of ethylene glycol having a condensation degree of 3 to 20.

An average amount of a residual hydroxy group of the polyvinyl acetal (A) is preferably from 20 to 40 mol %.

An average amount of a residual hydroxy group of the polyvinyl acetal (B) is preferably from 10 to 35 mol %, and an average amount of a residual vinyl ester group is preferably from 0.01 to 25 mol %.

The content of the plasticizer (Ap) with respect to 100 parts by mass of the polyvinyl acetal (A) in the layer A is preferably less than the content of the plasticizer (Bp) with respect to 100 parts by mass of the polyvinyl acetal (B) in the layer B.

The content of the plasticizer (Ap) in the layer A is preferably from 20 to 60 parts by mass with respect to 100 parts by mass of the polyvinyl acetal (A).

The content of the plasticizer (Bp) in the layer B is preferably from 30 to 80 parts by mass with respect to 100 parts by mass of the polyvinyl acetal (B).

In the monovalent carboxylic acid, at least two organic groups other than a carbonyl group are preferably bonded to a carbon atom adjacent to the carboxyl group.

The laminate preferably comprising three or more layers, and at least one of the two outer layers of the laminate is preferably the layer A.

According to the present invention, the above-described object is suitably achieved by providing a laminated glass comprising the above-described laminate.

Advantageous Effects of Invention

According to the present invention, it is possible to provide a laminate in which a plasticizer is not easily extracted with water and does not easily volatilize, water or the plasticizer does not easily cause phase separation from a polyvinyl acetal even when the laminate having a high water content is rapidly dried in an atmosphere of a low temperature and a low humidity, and water or the plasticizer does not easily bleed between layers.

DESCRIPTION OF EMBODIMENTS

First, a polyvinyl acetal used in the present invention will be described.

The average amount of a residual hydroxy group of a polyvinyl acetal (A) used in the present invention is not particularly limited, but is usually preferably from 20 to 40 mol %, more preferably from 23 to 38 mol %, still more preferably from 25 to 36 mol %, particularly preferably from 26 to 29 mol %. When the average amount of the residual hydroxy group is less than 20 mol %, the mechanical strength or adhesion to glass of an obtained laminate may be reduced. When the average amount of the residual hydroxy group is more than 40 mol %, compatibility with a plasticizer (Ap) may be significantly reduced.

The average acetalization degree of the polyvinyl acetal (A) is not limited, but is usually preferably from 50 to 78 mol %, more preferably from 60 to 74 mol %, still more preferably from 65 to 73 mol %. When the average acetalization degree is less than 50 mol %, compatibility with the plasticizer (Ap) may be significantly reduced. When the average acetalization degree is more than 78 mol %, the mechanical strength of an obtained laminate may be reduced.

The average amount of a residual vinyl ester group of the polyvinyl acetal (A) is not particularly limited, but is usually preferably from 0.01 to 15 mol %, more preferably from 0.01 to 10 mol %, still more preferably from 0.01 to 5 mol %. It is difficult to manufacture the polyvinyl acetal (A) having an average amount of the residual vinyl ester group of less than 0.01 mol % industrially and inexpensively. When the average amount of the residual vinyl ester group is more than 15 mol %, an obtained laminate is easily colored after use thereof for a long time due to hydrolysis of the vinyl ester group.

The average amount of a residual hydroxy group of a polyvinyl acetal (B) used in the present invention is not particularly limited, but is usually preferably from 10 to 35 mol %, more preferably from 13 to 33 mol %, still more preferably from 15 to 30 mol %. When the average amount of the residual hydroxy group is less than 10 mol %, the mechanical strength or adhesion to glass may be significantly reduced. When the average amount of the residual hydroxy group is more than 35 mol %, compatibility with a plasticizer (Bp) may be reduced.

The average acetalization degree of the polyvinyl acetal (B) is not limited, but is usually preferably from 60 to 84 mol %, more preferably from 65 to 82 mol %, still more preferably from 70 to 80 mol %. When the average acetalization degree is less than 60 mol %, compatibility with the plasticizer (Bp) may be reduced. When the average acetalization degree is more than 84 mol %, the mechanical strength of an obtained laminate may be reduced.

The average amount of a residual vinyl ester group of the polyvinyl acetal (B) is not particularly limited, but is usually preferably from 0.01 to 25 mol %, more preferably from 3 to 16 mol %, still more preferably from 3 to 15 mol %, particularly preferably from 4 to 13 mol %. It is difficult to manufacture the polyvinyl acetal (B) having an average amount of the residual vinyl ester group of less than 0.01 mol % industrially and inexpensively, and the polyvinyl acetal (B) having an average amount of the residual vinyl ester group of less than 0.01 mol % may reduce compatibility with the plasticizer (Bp). When the average amount of the residual vinyl ester group is more than 25 mol %, an obtained laminate is easily colored after use thereof for a long time due to hydrolysis of the vinyl ester group.

The average amount of the residual hydroxy group of the polyvinyl acetal (A) is preferably larger than the average amount of the residual hydroxy group of the polyvinyl acetal (B), more preferably larger by 3 to 20 mol %, particularly preferably larger by 5 to 15 mol %. When such a relation of the average amount of the residual hydroxy group is satisfied, even when a laminate having a high water content is dried rapidly in an atmosphere of a low temperature and a low humidity, water or a plasticizer does not easily cause phase separation from a polyvinyl acetal in the laminate, and water or the plasticizer does not easily bleed between layers. That is, it is preferable to satisfy the above-described relation. In addition, when the laminate is used as a sound insulating interlayer film for laminated glass, it is preferable to satisfy the above-described relation from a viewpoint of exhibiting sound insulating property.

The polyvinyl acetal (A) and the polyvinyl acetal (B) used in the present invention are manufactured by using a polyvinyl alcohol as a raw material. The polyvinyl alcohol can be obtained by a conventionally known method. That is, the polyvinyl alcohol can be obtained by polymerizing a vinyl ester compound and saponifying the obtained polymer. As a method for polymerizing a vinyl ester compound, a conventionally known method such as a solution polymerization method, a bulk polymerization method, a suspension polymerization method, or an emulsion polymerization method, can be applied. As a polymerization initiator used in these polymerization methods, an azo initiator, a peroxide initiator, a redox initiator, or the like can be used appropriately. A saponification reaction is performed by subjecting a vinyl ester group in a polymer to alcoholysis or hydrolysis by using a conventionally known alkali catalyst or acid catalyst. Above all, a saponification reaction using methanol as a solvent and using caustic soda (NaOH) as a catalyst is simple and most preferable.

Examples of the vinyl ester compound include a conventionally known carboxylic acid vinyl ester such as vinyl formate, vinyl acetate, vinyl propionate, vinyl butyrate, vinyl stearate, or vinyl benzoate. Vinyl acetate is preferable.

It is also possible to use a modified polyvinyl alcohol obtained by saponifying a copolymer obtained by copolymerizing a vinyl ester compound and a monomer copolymerizable with the vinyl ester compound as a polyvinyl alcohol unless contrary to the gist of the present invention. The monomer copolymerizable with the vinyl ester compound is usually used in an amount of less than 10 mol % with respect to the vinyl ester compound.

The viscosity average polymerization degree of the polyvinyl alcohol as a raw material of the polyvinyl acetal used in the present invention is not particularly limited, may be appropriately selected according to an application thereof, but is usually preferably from 150 to 3000, more preferably from 200 to 2500, still more preferably from 1000 to 2000. When the viscosity average polymerization degree of the polyvinyl alcohol is lower than 150, the mechanical strength of an obtained laminate tends to be insufficient. When the viscosity average polymerization degree is higher than 3000, an obtained laminate may have a poor handling property.

The polyvinyl acetal used in the present invention can be manufactured by a conventionally known method. For example, the polyvinyl acetal can be manufactured by a precipitation method under the following reaction conditions. First, the temperature of a polyvinyl alcohol aqueous solution having a concentration of 3 to 40% by mass is maintained in a temperature range of 80 to 100° C., and then is lowered gradually over 10 to 60 minutes. When the temperature is lowered to −10 to 30° C., an aldehyde and an acid catalyst are added thereto, and an acetalization reaction is performed for 30 to 300 minutes while the temperature is maintained constant. At this time, a polyvinyl acetal the acetalization degree of which has reached a certain level precipitates. Thereafter, the temperature of the reaction liquid is raised to 30 to 80° C. over 30 to 300 minutes, and the temperature is maintained for 10 to 500 minutes. Subsequently, the acid catalyst is neutralized by adding a basic compound to the reaction solution. The precipitate is washed with water and dried to obtain a polyvinyl acetal.

The acid catalyst used for the acetalization reaction is not particularly limited. Either an organic acid such as acetic acid or para-toluene sulfonic acid, or an inorganic acid such as nitric acid, sulfuric acid, or hydrochloric acid can be used. Hydrochloric acid, sulfuric acid, or nitric acid is particularly preferable.

The aldehyde used for the acetalization reaction is not particularly limited, but acetalization is preferably performed using an aldehyde having 1 to 8 carbon atoms. Above all, an aldehyde having 4 to 6 carbon atoms is preferably used, and n-butylaldehyde is particularly preferably used. In the present invention, a polyvinyl acetal obtained by using two or more kinds of aldehydes together can be also used.

The plasticizer (Ap) included in a layer A constituting the laminate of the present invention is an ester compound having a chemical structure obtained by an esterification reaction of one molecule of an m-valent alcohol with m molecules of a monovalent carboxylic acid having 8 to 16 carbon atoms. Here, m represents a natural number of 2 to 4. However, the plasticizer (Ap) is only required to have a chemical structure obtained by an esterification reaction of one molecule of an m-valent alcohol with m molecules of a monovalent carboxylic acid having 8 to 16 carbon atoms. The plasticizer (Ap) obtained by a method other than the esterification reaction of one molecule of an m-valent alcohol with m molecules of a monovalent carboxylic acid having 8 to 16 carbon atoms can be used.

Examples of the m-valent alcohol include a divalent alcohol such as ethylene glycol, a condensate of ethylene glycol, propylene glycol, a condensate of propylene glycol, 3-methyl-1,5-pentanediol, or 1,4-cyclohexane dimethanol; a trivalent alcohol such as glycerin; and a tetravalent alcohol such as erythritol or pentaerythritol. Above all, from viewpoints that the obtained plasticizer (Ap) has excellent compatibility with the polyvinyl acetal (A), an excellent plasticizing effect, and a high boiling point, and is not easily extracted with water even when the laminate comes into contact with water, a divalent alcohol is preferable, a condensate of ethylene glycol such as a condensate of triethylene glycol or a condensate of tetraethylene glycol is more preferable, ethylene glycol having a condensation degree of 3 to 20 is still more preferable, a condensate of ethylene glycol having a condensation degree of 3 to 10 is particularly preferable, a condensate of ethylene glycol having a condensation degree of 3 or 4 is most preferable.

Examples of the monovalent carboxylic acid having 8 to 16 carbon atoms include octanoic acid, 2-ethylhexanoic acid, nonanoic acid, decanoic acid, dodecanoic acid, hexadecanoic acid, 2-methyl heptanoic acid, 2-ethyl heptanoic acid, and 2,2-dimethyl hexanoic acid. Above all, a monovalent carboxylic acid having 8 to 12 carbon atoms, particularly 8 to 10 carbon atoms, is preferable from viewpoints that the obtained plasticizer (Ap) has excellent compatibility with the polyvinyl acetal (A), an excellent plasticizing effect, and a high boiling point, and is not easily extracted with water even when the laminate comes into contact with water. A monovalent carboxylic acid in which at least two organic groups other than a carboxyl group are bonded to a carbon atom adjacent to the carboxyl group is preferable from a viewpoint of enhancing hydrolysis resistance of the plasticizer (Ap). Examples of such a monovalent carboxylic acid include 2-ethylhexanoic acid, 2-methyl heptanoic acid, 2-ethyl heptanoic acid, and 2,2-dimethyl hexanoic acid.

Examples of the ester compound having a chemical structure obtained by an esterification reaction of one molecule of an m-valent alcohol with m molecules of a monovalent carboxylic acid having 8 to 16 carbon atoms include triethylene glycol di-2-ethylhexanoate, tetraethylene glycol di-2-ethylhexanoate, triethylene glycol dinonanoate, triethylene glycol didecanoate, triethylene glycol didodecanoate, decaethylene glycol di-2-ethylhexanoate, and glycerin tri-2-ethylhexanoate. Above all, triethylene glycol di-2-ethylhexanoate, tetraethylene glycol di-2-ethylhexanoate, triethylene glycol dinonanoate, and glycerin tri-2-ethylhexanoate are preferable from viewpoints of having excellent compatibility with the polyvinyl acetal (A), an excellent plasticizing effect, and a high boiling point, and being not easily extracted with water even when the laminate comes into contact with water. These may be each used singly, or may be used in mixture of two or more kinds thereof.

The content of the plasticizer (Ap) in the layer A constituting the laminate of the present invention is not particularly limited, but is usually preferably from 20 to 60 parts by mass, more preferably from 25 to 55 parts by mass, still more preferably from 30 to 50 parts by mass with respect to 100 parts by mass of the polyvinyl acetal (A). When the content of the plasticizer (Ap) is less than 20 parts by mass with respect to 100 parts by mass of the polyvinyl acetal (A), an obtained laminate tends to have insufficient flexibility, and shock absorption as an interlayer film for laminated glass may cause a problem. When the content of the plasticizer (Ap) is more than 60 parts by mass, an obtained laminate tends to have insufficient mechanical strength.

The plasticizer (Bp) included in a layer B constituting the laminate of the present invention is an ester compound having a chemical structure obtained by an esterification reaction of one molecule of an n-valent alcohol with n molecules of a monovalent carboxylic acid having 8 to 16 carbon atoms. Here, n represents a natural number of 2 to 4. However, the plasticizer (Bp) is only required to have a chemical structure obtained by an esterification reaction of one molecule of an n-valent alcohol with n molecules of a monovalent carboxylic acid having 8 to 16 carbon atoms. The plasticizer (Bp) obtained by a method other than the esterification reaction of one molecule of an n-valent alcohol with n molecules of a monovalent carboxylic acid having 8 to 16 carbon atoms can be used.

Examples of the n-valent alcohol include similar compounds to the compounds exemplified as the m-valent alcohol, and preferable compounds thereof are also similar.

Examples of the ester compound having a chemical structure obtained by an esterification reaction of one molecule of an n-valent alcohol with n molecules of a monovalent carboxylic acid having 8 to 16 carbon atoms include triethylene glycol di-2-ethylhexanoate, tetraethylene glycol di-2-ethylhexanoate, triethylene glycol dinonanoate, triethylene glycol didecanoate, triethylene glycol didodecanoate, decaethylene glycol di-2-ethylhexanoate, and glycerin tri-2-ethylhexanoate. Above all, triethylene glycol di-2-ethylhexanoate, tetraethylene glycol di-2-ethylhexanoate, triethylene glycol dinonanoate, and glycerin tri-2-ethylhexanoate are preferable from viewpoints of having excellent compatibility with the polyvinyl acetal (B), an excellent plasticizing effect, and a high boiling point, and being not easily extracted with water even when the laminate comes into contact with water. These may be each used singly, or may be used in mixture of two or more kinds thereof.

The content of the plasticizer (Bp) in the layer B constituting the laminate of the present invention is not particularly limited, but is usually preferably from 30 to 80 parts by mass, more preferably from 33 to 75 parts by mass, still more preferably from 40 to 70 parts by mass with respect to 100 parts by mass of the polyvinyl acetal (B). When the content of the plasticizer (Bp) is less than 30 parts by mass with respect to 100 parts by mass of the polyvinyl acetal (B), an obtained laminate cannot necessarily exhibit desired sound insulating property when the laminate is used as a sound insulating interlayer film for laminated glass. When the content of the plasticizer (Bp) is more than 80 parts by mass, an obtained laminate tends to have insufficient mechanical strength.

In the present invention, a relation between the content of the plasticizer (Ap) in the layer A and the content of the plasticizer (Bp) in the layer B is not limited strictly. However, the content of the plasticizer (Ap) with respect to 100 parts by mass of the polyvinyl acetal (A) in the layer A is preferably less than the content of the plasticizer (Bp) with respect to 100 parts by mass of the polyvinyl acetal (B) in the layer B. The content of the plasticizer (Ap) with respect to 100 parts by mass of the polyvinyl acetal (A) is less than the content of the plasticizer (Bp) with respect to 100 parts by mass of the polyvinyl acetal (B) preferably by 5 to 60 parts by mass, more preferably by 10 to 40 parts by mass, from a viewpoint of being able to exhibit sound insulating property in laminated glass using the laminate of the present invention.

Next, a dispersant (Ad) will be described. The dispersant (Ad) has a chemical structure obtained by hydrolyzing at least one ester bond of the plasticizer (Ap), and has (m−1) to 1 hydroxy groups and 1 to (m−1) ester bonds. However, the dispersant (Ad) is only required to have a chemical structure obtained by hydrolyzing at least one ester bond of the plasticizer (Ap). The dispersant (Ad) obtained by a method other than hydrolysis of the plasticizer (Ap) can be used. Examples of the dispersant (Ad) include triethylene glycol mono-2-ethylhexanoate (having a chemical structure obtained by hydrolyzing one ester bond of triethylene glycol di-2-ethylhexanoate), tetraethylene glycol mono-2-ethyl hexanoate (having a chemical structure obtained by hydrolyzing one ester bond of tetraethylene glycol di-2-ethylhexanoate), triethylene glycol mono-decanoate (having a chemical structure obtained by hydrolyzing one ester bond of triethylene glycol didecanoate), triethylene glycol mono-dodecanoate (having a chemical structure obtained by hydrolyzing one ester bond of tetraethylene glycol didodecanoate), decaethylene glycol mono-2-ethylhexanoate (having a chemical structure obtained by hydrolyzing one ester bond of decaethylene glycol di-2-ethyl hexanoate), triethylene glycol mono-nonanoate (having a chemical structure obtained by hydrolyzing one ester bond of triethylene glycol di-nonanoate), glycerin di-2-ethylhexanoate (having a chemical structure obtained by hydrolyzing one ester bond of glycerin tri-2-ethylhexanoate), and glycerin mono-2-ethylhexanoate (having a chemical structure obtained by hydrolyzing two ester bonds of glycerin tri-2-ethyl hexanoate). Above all, triethylene glycol mono-2-ethylhexanoate, tetraethylene glycol mono-2-ethylhexanoate, and triethylene glycol mono-nonanoate are particularly preferable because these compounds are liquid at normal temperature and have an excellent handling property, and have particularly excellent compatibility with the polyvinyl acetal (A) and the plasticizer (Ap).

The content of the dispersant (Ad) in the layer A constituting the laminate of the present invention is not particularly limited, but is usually preferably from 0.01 to 6 parts by mass, more preferably from 0.06 to 4 parts by mass, still more preferably from 0.09 to 2.4 parts by mass with respect to 100 parts by mass of the polyvinyl acetal (A). In a case where the content of the dispersant (Ad) is less than 0.01 parts by mass, when the laminate having a high water content is dried rapidly in an atmosphere of a low temperature and a low humidity, water or a plasticizer may cause phase separation from a polyvinyl acetal in the laminate to make the laminate opaque, or water or the plasticizer may bleed between layers of the laminate to cause interlayer peeling or reduction in transparency. In a case where the content of the dispersant (Ad) is more than 6 parts by mass, the dispersant (Ad) may volatilize or may be extracted with water when the layer A comes into contact with water to change physical properties of the layer A.

A dispersant (Bd) has a chemical structure obtained by hydrolyzing at least one ester bond of the plasticizer (Bp), and has (n−1) to 1 hydroxy groups and 1 to (n−1) ester bonds. However, the dispersant (Bd) is only required to have a chemical structure obtained by hydrolyzing at least one ester bond of the plasticizer (Bp). The dispersant (Bd) obtained by a method other than hydrolysis of the plasticizer (Bp) can be used. Examples of the dispersant (Bd) include triethylene glycol mono-2-ethylhexanoate, tetraethylene glycol mono-2-ethylhexanoate, triethylene glycol mono-decanoate, triethylene glycol mono-dodecanoate, decaethylene glycol mono-2-ethylhexanoate, triethylene glycol mono-nonanoate, glycerin di-2-ethylhexanoate, and glycerin mono-2-ethylhexanoate. Above all, triethylene glycol mono-2-ethylhexanoate, tetraethylene glycol mono-2-ethylhexanoate, and triethylene glycol mono-nonanoate are particularly preferable because these compounds are liquid at normal temperature and have an excellent handling property, and have particularly excellent compatibility with the polyvinyl acetal (B) and the plasticizer (Bp).

The content of the dispersant (B) in the layer B constituting the laminate of the present invention is not particularly limited, but is usually preferably from 0 to 4 parts by mass, more preferably from 0.01 to 3 parts by mass, still more preferably from 0.03 to 2.2 parts by mass with respect to 100 parts by mass of the polyvinyl acetal (B). Note that 0 part by mass of the content of the dispersant (Bd) means that the layer B includes no dispersant (Bd). In a case where the content of the dispersant (Bd) is more than 4 parts by mass, when the layer B comes into contact with water, the dispersant (Bd) may volatilize or may be extracted with water to change physical properties of the layer B.

In the present invention, it is necessary that a mass ratio (hereinafter, referred to as mass ratio A) of the content of the dispersant (Ad) with respect to the content of the plasticizer (Ap) in the layer A is larger than a mass ratio (hereinafter, referred to as mass ratio B) of the content of the dispersant (Bd) with respect to the content of the plasticizer (Bp) in the layer B. The mass ratio B is preferably 0, or the mass ratio A is preferably 1.05 times or more as large as the mass ratio B. The mass ratio A is more preferably 1.1 times or more, still more preferably 1.25 times or more, particularly preferably 1.5 times or more as large as the mass ratio B. In a laminate having the mass ratio A equal to or smaller than the mass ratio B, when the laminate having a high water content is dried rapidly in an atmosphere of a low temperature and a low humidity, water or a plasticizer may cause phase separation from a polyvinyl acetal in the laminate to make the laminate opaque, or water or the plasticizer may bleed between layers of the laminate to cause interlayer peeling or reduction in transparency.

In the present invention, the plasticizer (Ap) may be the same as or different from the plasticizer (Bp). However, the plasticizers (Ap) and (Bp) are preferably the same from a viewpoint of reduction in cost in manufacturing the layers A and B.

The laminate of the present invention may further include an antioxidant, an ultraviolet absorber, an adhesion improver, and other additives.

The kind of an antioxidant which may be included in the laminate of the present invention is not particularly limited. Examples thereof include a conventionally known phenol antioxidant, phosphorus antioxidant, and sulfur antioxidant. Above all, the phenol antioxidant is preferable. Antioxidants may be each used singly or may be used in combination of two or more kinds thereof. When an antioxidant is included, the amount thereof is not particularly limited, but is usually preferably 0.0001 to 5% by mass, more preferably 0.001 to 1% by mass, with respect to the mass of the laminate. When the amount of the antioxidant is less than 0.0001% by mass, a sufficient effect as an antioxidant is not necessarily obtained. Even when the amount of the antioxidant is more than 5% by mass, a remarkable effect cannot be expected.

The kind of an ultraviolet absorber which may be included in the laminate of the present invention is not particularly limited. Examples thereof include a conventionally known benzotriazole ultraviolet absorber, anilide oxalate ultraviolet absorber, and benzoate ultraviolet absorber. Ultraviolet absorbers may be each used singly or may be used in combination of two or more kinds thereof. When an ultraviolet absorber is included, the amount thereof is not particularly limited, but is usually preferably from 0.0001 to 5% by mass, more preferably from 0.001 to 1% by mass, with respect to the mass of the laminate. When the amount of the ultraviolet absorber is less than 0.0001% by mass, a sufficient effect as an ultraviolet absorber is not necessarily obtained. Even when the amount of the ultraviolet absorber is more than 5% by mass, a remarkable effect cannot be expected.

The laminate of the present invention is particularly preferably used as an interlayer film for laminated glass. In this case, an adhesion adjusting agent is preferably added to a layer bonded to glass. Examples of the adhesion adjusting agent include a sodium salt, a potassium salt, and a magnesium salt of an organic acid such as acetic acid, propionic acid, butanoic acid, hexanoic acid, 2-ethyl butanoic acid, or 2-ethyl hexanoic acid. Two or more kinds thereof may be added.

Particularly when the layer A is bonded to glass, a magnesium salt such as magnesium acetate, magnesium acetate tetrahydrate, magnesium butanoate, 2-ethyl magnesium butanoate, or 2-ethyl magnesium hexanoate is preferably added to the layer A. The addition amount of the adhesion adjusting agent is preferably from 0.001 to 0.1 parts by mass, more preferably from 0.005 to 0.08 parts by mass, still more preferably from 0.01 to 0.06 parts by mass, particularly preferably from 0.03 to 0.055 parts by mass with respect to 100 parts by mass of the polyvinyl acetal (A) from viewpoints of penetration resistance of laminated glass and an antiscattering property of glass fragment at the time of breakage of laminated glass. A magnesium salt less easily absorbs water than a potassium salt or a sodium salt. Therefore, in a case where a magnesium salt is added to the layer A as an adhesion adjusting agent, even when a laminate having a high water content is dried rapidly in an atmosphere of a low temperature and a low humidity, water or a plasticizer does not easily cause phase separation from a polyvinyl acetal in the laminate, and water or the plasticizer does not easily bleed between layers of the laminate.

A method for manufacturing the laminate of the present invention is not particularly limited, and a conventionally known method can be applied. Examples thereof include a method of melt-kneading each of components constituting the layer A and components constituting the layer B in an extruder, and subsequently co-extruding the components using a multilayer film-forming machine, and a method of manufacturing each of the layer A and the layer B by thermal pressing, casting, or the like after melt-kneading, laminating the layer A and the layer B, and bonding the layer A and the layer B to each other by thermal pressing or the like, if necessary, to be laminated.

The water content of the laminate of the present invention is not particularly limited. However, when the water content is too high, a plasticizer may bleed from the laminate. Therefore, the water content is usually preferably from 0.01 to 0.9% by mass, more preferably from 0.2 to 0.8% by mass, still more preferably from 0.2 to 0.7% by mass.

The thickness of the layer A or the layer B in the laminate of the present invention is not particularly limited. The thickness of the layer A is usually preferably from 0.05 to 1.2 mm, more preferably from 0.07 to 1 mm, still more preferably from 0.1 to 0.7 mm. When the thickness is thinner than 0.05 mm, the mechanical strength of the laminate of the present invention tends to be reduced. When the thickness is thicker than 1.2 mm, the flexibility of the laminate of the present invention tends to be insufficient, and the safety of obtained laminated glass may be reduced in use as an interlayer film for laminated glass.

The thickness of the layer B is usually preferably from 0.01 to 1 mm, more preferably from 0.02 to 0.8 mm, still more preferably from 0.05 to 0.5 mm. When the thickness is thinner than 0.01 mm, sound insulating property of laminated glass including the laminate of the present invention as an interlayer film may be reduced. Even when the thickness is thicker than 1 mm, the mechanical strength of the laminate of the present invention tends not to be further improved.

A ratio of the thickness of the layer A with respect to the thickness of the layer B is not particularly limited, but is preferably from 0.05 to 4, more preferably from 0.07 to 2, still more preferably from 0.1 to 0.8 from a viewpoint of exhibiting the mechanical strength or the sound insulating property.

In the laminate of the present invention, at least one layer of the outermost layers of the laminate is preferably the layer A. Examples of such a laminate include a laminate in which both the outermost layers are the layers A, such as layer A/layer B/layer A or layer A/layer B/layer A/layer B/layer A, and a laminate in which one layer is the layer A, such as layer A/layer B, or layer A/layer B/layer A/layer B. Particularly when the laminate of the present invention is used as an interlayer film for laminated glass, a laminate in which both the outermost layers are the layer A is preferable because adhesion between the laminate and glass can be properly controlled.

When the laminate of the present invention is used as an interlayer film for laminated glass, the thickness of the laminate is not particularly limited, but is usually preferably from 0.2 to 2 mm, more preferably from 0.25 to 1.8 mm, still more preferably from 0.3 to 1.5 mm. When the thickness of the laminate is thinner than 0.2 mm, the mechanical strength tends to be insufficient. When the thickness is thicker than 2 mm, the flexibility tends to be insufficient.

When the laminate of the present invention is used as an interlayer film for laminated glass, the material of glass is not particularly limited, and conventionally known glass can be used. Examples thereof include inorganic glass such as float glass, thermally reinforced glass, or chemically reinforced glass, and organic glass such as polymethyl methacrylate or polycarbonate. These materials may be colorless or colored, and transparent or non-transparent. These materials may be used in combination of two or more kinds thereof. The thickness of the glass is not particularly limited, but is usually preferably 20 mm or less, more preferably 10 mm or less.

When the laminate of the present invention is used as an interlayer film for laminated glass, the shape of the outermost surface of the laminate is not particularly limited. However, considering a handling property (for example, a defoaming property in laminating) in manufacturing laminated glass, the outermost surface of the laminate preferably has an uneven structure formed by a conventionally known method such as melt fracture or embossing.

A method for manufacturing laminated glass using the laminate of the present invention as an interlayer film for laminated glass is not particularly limited, and a conventionally known method is used. Examples thereof include a method of performing a depressurizing step using a vacuum laminator or a vacuum bag, and a method of performing temporary bonding using a nip roll and then performing a treatment using an autoclave.

An example of manufacturing conditions in using a vacuum laminator will be described. Glass and an interlayer film for laminated glass are laminated under a reduced pressure of $1\times10^{-6}$ to $3\times10^{-2}$ MPa at a temperature of 100 to 200° C., preferably of 130 to 160° C. A method using a vacuum bag is described, for example, in EP 1235683 B1. For example, laminating is performed under a pressure of about $2\times10^{-2}$ MPa at a temperature of 130 to 145° C.

In the method of performing temporary bonding using a nip roll and then performing a treatment using an autoclave, an example of operation conditions of the nip roll is as follows. That is, glass and a laminate are heated to 30 to 70° C. with an infrared heater or the like, and then degassing is performed by sandwiching the glass and the laminate by rolls. The glass and the laminate are further heated to 50 to 120° C., and then are temporarily bonded by pressure bonding with the rolls. The step of performing a treatment using an autoclave is performed, for example, under a pressure of about 1.0 to 1.5 MPa at a temperature of 130 to 145° C. for 30 minutes to 200 minutes.

EXAMPLES

Hereinafter, the present invention will be described in more detail with Examples or the like. However, the present invention is not limited in any way by these Examples.
(Preparation of PVB-1)

Into a three L (liters) glass container equipped with a reflux condenser, a thermometer, and an anchor type stirring blade, 2000 g of ion-exchanged water and 200 g of polyvinyl alcohol (PVA-1) (viscosity average polymerization degree: 1700, saponification degree: 99 mol %) were put (PVA concentration: 9.1%), and the contents were completely dissolved by raising the temperature to 95° C. Subsequently, the contents were gradually cooled to 7° C. over about 30 minutes while being stirred at 120 rpm. Thereafter, 113 g of butylaldehyde and 70 g of 35% hydrochloric acid were added, and a butyralization reaction was performed for 30 minutes. Thereafter, the temperature was raised to 60° C. over 60 minutes and maintained at 60° C. for 120 minutes. Immediately thereafter, cooling was performed using a cold water bath. A polyvinyl acetal resin was washed with ion-exchanged water, and then a residual acid catalyst was neutralized with a sodium hydroxide aqueous solution. The polyvinyl acetal resin was further washed with ion-exchanged water, dehydrated, and dried to obtain a polyvinyl butyral (PVB-1). When the obtained polyvinyl butyral (PVB-1) was measured in accordance with JIS K 6728, as indicated in Table 1, the average acetalization degree was 68 mol %, the average amount of a residual vinyl ester group was 1 mol %, and the average amount of a residual hydroxy group was 31 mol %.
(Preparation of PVB-2)

A reaction was performed similarly to the preparation of PVB-1 except that the use amount of butylaldehyde was changed to 118 g to obtain PVB-2. When the obtained PVB-2 was measured in accordance with JIS K 6728, as indicated in Table 1, the average acetalization degree was 71 mol %, the average amount of a residual vinyl ester group was 1 mol %, and the average amount of a residual hydroxy group was 28 mol %.
(Preparation of PVB-3)

PVB-3 was obtained similarly to the preparation of PVB-1 except that PVA-1 was changed to 200 g of PVA-2 (viscosity average polymerization degree: 1700, saponification degree: 92 mol %), the use amount of butylaldehyde was changed to 120 g, the butyralization reaction was performed at 5° C., the temperature was then raised to 68° C. over 70 minutes, and the reaction was performed at 68° C. for 110 minutes. When the obtained PVB-3 was measured in accordance with JIS K 6728, as indicated in Table 1, the average acetalization degree was 74 mol %, the average amount of a residual vinyl ester group was 7 mol %, and the average amount of a residual hydroxy group was 19 mol %.
(Preparation of PVB-4)

PVB-4 was obtained similarly to the preparation of PVB-3 except that PVA-2 was changed to 200 g of PVA-3 (viscosity average polymerization degree: 1700, saponification degree: 89 mol %), the use amount of butylaldehyde was changed to 117 g, the butyralization reaction was performed at 5° C., the temperature was then raised to 65° C. over 70 minutes, and the reaction was performed at 65° C. for 140 minutes. When the obtained PVB-4 was measured in accordance with JIS K 6728, as indicated in Table 1, the average acetalization degree was 75 mol %, the average amount of a residual vinyl ester group was 9 mol %, and the average amount of a residual hydroxy group was 16 mol %.

TABLE 1

|  | average amount of residual hydroxy group (mol %) | average acetalization degree (mol %) | average amount of residual vinyl ester group (mol %) |
| --- | --- | --- | --- |
| PVB-1 | 31 | 68 | 1 |
| PVB-2 | 28 | 71 | 1 |
| PVB-3 | 19 | 74 | 7 |
| PVB-4 | 16 | 75 | 9 |

Example 1

(Manufacturing Laminate)

100 parts by mass of PVB-1, 39 parts by mass of triethylene glycol di-2-ethylhexanoate as the plasticizer (Ap), 0.3 parts by mass of triethylene glycol mono-2-ethylhexanoate as the dispersant (Ad), and 0.048 parts by mass of magnesium acetate tetrahydrate were kneaded at 160° C. for 8 minutes with a labo plastomill. The resulting kneaded product was pressed by using a mold having a thickness of 0.38 mm under conditions of 160° C. and 50 kg/cm$^2$ for 30 minutes to obtain a sheet A having a thickness of 0.38 mm. Meanwhile, 100 parts by mass of PVB-3, 60 parts by mass of triethylene glycol di-2-ethylhexanoate as the plasticizer (Bp), and 0.2 parts by mass of triethylene glycol mono-2-ethylhexanoate as the dispersant (Bd) were kneaded at 160° C. for 8 minutes with a labo plastomill. The resulting kneaded product was pressed by using a mold having a thickness of 0.15 mm under conditions of 160° C. and 50 kg/cm$^2$ for 30 minutes to obtain a sheet B having a thickness of 0.15 mm. The sheets A and B were laminated in the order of sheet A/sheet B/sheet A, and pressed by using a mold having a thickness of 0.9 mm under conditions of 135° C. and 10 kg/cm$^2$ to obtain a laminate-1 including layer A (0.38 mm)/layer B (0.14 mm)/layer A (0.38 mm).
(Humidity Control of Laminate Having High Water Content)

The laminate-1 obtained above was subjected to humidity control in an atmosphere of 35° C. and 80% RH in a constant temperature and humidity bath for 12 hours. The laminate-1 which had been subjected to humidity control was further subjected to humidity control under the respective conditions of the following (a) to (c), and was evaluated based on the following criteria. As a result, "18 hours" was obtained.

Condition (a): treated at 23° C. and 28% RH for 18 hours.
Condition (b): treated at 29° C. and 55% RH for 18 hours, followed by treatment at 23° C. and 28% RH for 18 hours.
Condition (c): treated at 32° C. and 68% RH for 18 hours, followed by treatment at 29° C. and 55% RH for 18 hours, further followed by treatment at 26° C. and 40% RH for 18 hours, further followed by treatment at 23° C. and 28% RH for 18 hours.

"18 hours": laminate not causing cloudiness or interlayer peeling in Condition (a) and having a water content of 0.7% or less "36 hours": laminate causing cloudiness or interlayer peeling in Condition (a), but not causing cloudiness or interlayer peeling in Condition (b) and having a water content of 0.7% or less "72 hours": laminate causing cloudiness or interlayer peeling in Conditions (a) and (b), but not causing cloudiness or interlayer peeling in Condition (c) and having a water content of 0.7% or less "18 hours" indicates that even when a laminate is dried rapidly, water or a plasticizer does not easily cause phase separation from a polyvinyl acetal in the laminate, and water or the plasticizer does not easily bleed between layers. In addition, it is indicated that "36 hours" requires more gradual drying and "72 hours" requires still more gradual drying.
(Test of Resistance to Plasticizer Bleeding when Water Content is High)

The laminate-1 obtained above was dried at 23° C. and 28% RH for five days, and then was treated in an atmosphere of 35° C. and 80% RH. 12 hours, 24, hours, and 48 hours after the treatment of the laminate-1 was started, the laminate-1 was visually observed. A laminate not causing plasticizer bleeding after 12 hours but causing plasticizer bleeding after 24 hours was evaluated as "12 hours". A laminate not causing plasticizer bleeding after 24 hours but causing plasticizer bleeding after 48 hours was evaluated as "24 hours". A laminate not causing plasticizer bleeding even after 48 hours was evaluated as "48 hours". As a result, "48 hours" was obtained.
(Manufacturing Laminated Glass)

The laminate-1 having a size of 30 cm×30 cm was stored in an atmosphere of 23° C. and 28% RH for five days and was subjected to humidity control. Immediately thereafter, the laminate-1 was sandwiched by two pieces of float glass (30 cm×30 cm×2.2 mm) and was heated to 115° C. Thereafter, the laminate-1 was temporarily bonded to the glass using a nip roll. The resulting temporarily bonded body was put into an autoclave, and was treated under conditions of 135° C. and 1.2 MPa for 60 minutes to obtain laminated glass-1.
(Hot Water Boiling Test of Laminated Glass)

The laminated glass-1 was treated with hot water at 60° C. for 12 hours, and then was treated in an atmosphere of 23° C. and 28% RH for 108 hours (This treatment is regarded as one cycle). This treatment was repeated 10 times, and then presence of defects caused by extraction of the components included in the laminate in each end of the laminated glass (peeling of glass and the interlayer film for laminated glass and peeling between layers of the interlayer film) was visually observed. When evaluation was performed by three stages of "absent", "slightly present", and "present", "absent" was obtained.

Examples 2 to 31, Comparative Examples 1 to 13

A laminate and laminated glass were manufactured in a similar manner to Example 1 except that the compositions of the layer A and layer B were changed as indicated in Tables 2 and 4, and evaluation was performed similarly. Results thereof are indicated in Tables 3 and 5.

TABLE 2

| | layer A | | | | | layer B | | | | |
|---|---|---|---|---|---|---|---|---|---|---|
| | polyvinyl acetal (A) (100 parts by mass) | plasticizer (Ap) | dispersant (Ad) | mass ratio A of dispersant (Ad)/ plasticizer (Ap) | magnesium acetate tetra- hydrate *2 | polyvinyl acetal (B) (100 parts by mass) | plasticizer (Bp) | dispersant (Bd) | mass ratio B of dispersant (Ad)/ plasticizer (Ap) | mass ratio A/mass ratio B *4 |
| | | kind / amount *2 | amount *2 | | | | kind / amount *3 | amount *3 | | |
| Example 1 | PVB-1 | 3G8 / 39 | 0.3 | 0.0077 | 0.048 | PVB-3 | 3G8 / 60 | 0.2 | 0.0033 | 2.3 |
| Example 2 | PVB-1 | 3G8 / 39 | 1 | 0.026 | 0.048 | PVB-3 | 3G8 / 60 | 0.2 | 0.0033 | 7.9 |
| Example 3 | PVB-1 | 3G8 / 39 | 2.5 | 0.064 | 0.048 | PVB-3 | 3G8 / 60 | 1.2 | 0.02 | 3.2 |
| Example 4 | PVB-1 | 3G8 / 39 | 0.3 | 0.0077 | 0.048 | PVB-3 | 3G8 / 65 | 0.2 | 0.0031 | 2.5 |
| Example 5 | PVB-1 | 3G8 / 39 | 1.5 | 0.038 | 0.048 | PVB-3 | 3G8 / 65 | 0.2 | 0.0031 | 12.3 |
| Example 6 | PVB-1 | 3G8 / 39 | 3 | 0.077 | 0.048 | PVB-3 | 3G8 / 65 | 0.2 | 0.0031 | 24.8 |
| Example 7 | PVB-1 | 3G8 / 39 | 0.3 | 0.0077 | 0.048 | PVB-3 | 3G8 / 60 | 0.02 | 0.00033 | 23.3 |
| Example 8 | PVB-1 | 3G8 / 39 | 0.1 | 0.0026 | 0.048 | PVB-3 | 3G8 / 60 | 0.02 | 0.00033 | 7.9 |
| Example 9 | PVB-1 | 3G8 / 39 | 0.1 | 0.0077 | 0.048 | PVB-3 | 3G8 / 60 | 0 | 0 | mass ratio B = 0 |
| Example 10 | PVB-1 | 3G8 / 39 | 1 | 0.026 | 0.048 | PVB-3 | 3G8 / 60 | 0.2 | 0.0033 | 7.9 |
| Example 11 | PVB-1 | 3G8 / 39 | 1 | 0.026 | 0.048 | PVB-3 | 3G8 / 60 | 0.6 | 0.01 | 2.6 |
| Example 12 | PVB-1 | 3G8 / 39 | 1.5 | 0.038 | 0.048 | PVB-3 | 3G8 / 60 | 2 | 0.033 | 1.2 |
| Example 13 | PVB-1 | 3G8 / 52 | 0.3 | 0.0058 | 0.054 | PVB-3 | 3G8 / 70 | 0.2 | 0.0029 | 2.0 |
| Example 14 | PVB-1 | 3G8 / 39 | 0.3 | 0.0077 | *1 | PVB-3 | 3G8 / 60 | 0.2 | 0.0033 | 2.3 |
| Example 15 | PVB-1 | 3G8 / 39 | 1 | 0.026 | *1 | PVB-3 | 3G8 / 60 | 0.2 | 0.0033 | 7.9 |
| Example 16 | PVB-1 | 3G8 / 39 | 2.5 | 0.064 | *1 | PVB-3 | 3G8 / 60 | 0.2 | 0.0033 | 19.4 |
| Example 17 | PVB-2 | 3G8 / 37 | 0.3 | 0.0081 | 0.048 | PVB-3 | 3G8 / 58 | 0.2 | 0.0034 | 2.4 |
| Example 18 | PVB-2 | 3G8 / 37 | 1 | 0.027 | 0.048 | PVB-3 | 3G8 / 58 | 0.2 | 0.0034 | 7.9 |
| Example 19 | PVB-2 | 3G8 / 37 | 0.3 | 0.0081 | 0.048 | PVB-4 | 3G8 / 58 | 0.2 | 0.0034 | 2.4 |
| Example 20 | PVB-2 | 3G8 / 37 | 1.1 | 0.030 | 0.048 | PVB-4 | 3G8 / 58 | 0.2 | 0.0034 | 8.8 |
| Example 21 | PVB-2 | 3G8 / 37 | 0.4 | 0.011 | 0.048 | PVB-4 | 3G8 / 58 | 0.5 | 0.0086 | 1.3 |
| Example 22 | PVB-2 | 3G8 / 37 | 1.8 | 0.049 | 0.048 | PVB-4 | 3G8 / 58 | 1.1 | 0.019 | 2.6 |
| Comparative Examples 1 | PVB-1 | 3G8 / 39 | 0 | 0 | 0.048 | PVB-3 | 3G8 / 60 | 0 | 0 | — |
| Comparative Examples 2 | PVB-1 | 3G8 / 39 | 0 | 0 | 0.048 | PVB-3 | 3G8 / 60 | 0.2 | 0.0033 | 0.0 |
| Comparative Examples 3 | PVB-1 | 3G8 / 39 | 0.05 | 0.0013 | 0.048 | PVB-3 | 3G8 / 60 | 0.2 | 0.0033 | 0.4 |
| Comparative Examples 4 | PVB-1 | 3G8 / 39 | 0.3 | 0.0077 | 0.048 | PVB-3 | 3G8 / 60 | 1 | 0.017 | 0.5 |
| Comparative Examples 5 | PVB-1 | 3G8 / 39 | 1 | 0.026 | 0.048 | PVB-3 | 3G8 / 60 | 2.5 | 0.042 | 0.6 |
| Comparative Examples 6 | PVB-2 | 3G8 / 37 | 0 | 0 | 0.048 | PVB-4 | 3G8 / 58 | 0.2 | 0.0034 | 0.0 |
| Comparative Examples 7 | PVB-2 | 3G8 / 37 | 0.3 | 0.0081 | 0.048 | PVB-4 | 3G8 / 58 | 1 | 0.017 | 0.5 |

*1: 0.04 parts by mass of potassium acetate with respect to 100 parts by mass of polyvinyl acetal (A) instead of magnesium acetate tetrahydrate
*2: a numerical value represents the addition amount (parts by mass) with respect to 100 parts by mass of polyvinyl acetal (A)
*3: a numerical value represents the addition amount (parts by mass) with respect to 100 parts by mass of polyvinyl acetal (B)
*4: mass ratio of dispersant (Ad)/plasticizer (Ap): mass ratio A, mass ratio of dispersant (Bd)/plasticizer (Bp): mass ratio B,
3G8: triethylene glycol di-2-ethylhexanoate

TABLE 3

| | time of humidity control | time of resistance to plasticizer bleeding when water content is high | hot water boiling test of laminated glass |
|---|---|---|---|
| Example 1 | 18 hours | 48 hours | absent |
| Example 2 | 18 hours | 48 hours | absent |
| Example 3 | 18 hours | 48 hours | slightly present |
| Example 4 | 18 hours | 48 hours | absent |
| Example 5 | 18 hours | 48 hours | absent |
| Example 6 | 18 hours | 48 hours | present |
| Example 7 | 18 hours | 24 hours | absent |
| Example 8 | 18 hours | 24 hours | absent |
| Example 9 | 18 hours | 12 hours | absent |
| Example 10 | 18 hours | 48 hours | absent |
| Example 11 | 18 hours | 48 hours | absent |
| Example 12 | 36 hours | 48 hours | absent |
| Example 13 | 18 hours | 48 hours | absent |
| Example 14 | 18 hours | 48 hours | absent |
| Example 15 | 18 hours | 48 hours | absent |
| Example 16 | 18 hours | 48 hours | slightly present |
| Example 17 | 18 hours | 48 hours | absent |
| Example 18 | 18 hours | 48 hours | absent |
| Example 19 | 18 hours | 48 hours | absent |
| Example 20 | 18 hours | 48 hours | absent |
| Example 21 | 18 hours | 48 hours | absent |
| Example 22 | 18 hours | 48 hours | absent |
| Comparative Examples 1 | 72 hours | 12 hours | absent |
| Comparative Examples 2 | 72 hours | 12 hours | absent |
| Comparative Examples 3 | 72 hours | 24 hours | absent |
| Comparative Examples 4 | 72 hours | 48 hours | absent |
| Comparative Examples 5 | 72 hours | 48 hours | slightly present |
| Comparative Examples 6 | 72 hours | 12 hours | absent |
| Comparative Examples 7 | 72 hours | 48 hours | absent |

TABLE 4

| | layer A | | | | | layer B | | | | |
|---|---|---|---|---|---|---|---|---|---|---|
| | polyvinyl acetal (A) (100 parts by mass) | plasticizer (Ap) kind | plasticizer (Ap) amount *2 | dispersant (Ad) amount *2 | mass ratio A of dispersant (Ad)/ plasticizer (Ap) | magnesium acetate tetra- hydrate *2 | polyvinyl acetal (B) (100 parts by mass) | plasticizer (Bp) kind | plasticizer (Bp) amount *3 | dispersant (Bd) amount *3 | mass ratio B of dispersant (Ad)/ plasticizer (Ap) | mass ratio A/mass ratio B *4 |
| Example 23 | PVB-1 | 4G8 | 40 | 0.3 | 0.0075 | 0.048 | PVB-3 | 4G8 | 60 | 0.2 | 0.0033 | 2.3 |
| Example 24 | PVB-1 | 4G8 | 40 | 1 | 0.025 | 0.048 | PVB-3 | 4G8 | 60 | 0.2 | 0.0033 | 7.6 |
| Example 25 | PVB-1 | 4G8 | 40 | 2.2 | 0.055 | 0.048 | PVB-3 | 4G8 | 60 | 0.2 | 0.0033 | 16.7 |
| Example 26 | PVB-1 | 3G9 | 40 | 0.3 | 0.0075 | 0.048 | PVB-3 | 3G9 | 60 | 0.2 | 0.0033 | 2.3 |
| Example 27 | PVB-1 | 3G9 | 40 | 1 | 0.025 | 0.048 | PVB-3 | 3G9 | 60 | 0.2 | 0.0033 | 7.6 |
| Example 28 | PVB-1 | 3G9 | 40 | 2.2 | 0.055 | 0.048 | PVB-3 | 3G9 | 60 | 0.2 | 0.0033 | 16.7 |
| Example 29 | PVB-1 | GT8 | 42 | 0.3 | 0.0071 | 0.048 | PVB-3 | GT8 | 63 | 0.3 | 0.0047 | 1.5 |
| Example 30 | PVB-1 | GT8 | 42 | 1.2 | 0.029 | 0.048 | PVB-3 | GT8 | 63 | 0.3 | 0.0047 | 6.2 |
| Example 31 | PVB-1 | GT8 | 42 | 2.5 | 0.060 | 0.048 | PVB-3 | GT8 | 63 | 0.3 | 0.0047 | 12.8 |
| Comparative Examples 8 | PVB-1 | 4G8 | 40 | 0 | 0 | 0.048 | PVB-3 | 4G8 | 60 | 0.2 | 0.0033 | 0.0 |
| Comparative Examples 9 | PVB-1 | 4G8 | 40 | 0.05 | 0.0013 | 0.048 | PVB-3 | 4G8 | 60 | 0.2 | 0.0033 | 0.4 |
| Comparative Examples 10 | PVB-1 | 3G9 | 40 | 0 | 0 | 0.048 | PVB-3 | 3G9 | 60 | 0.2 | 0.0033 | 0.0 |
| Comparative Examples 11 | PVB-1 | 3G9 | 40 | 0.05 | 0.0013 | 0.048 | PVB-3 | 3G9 | 60 | 0.2 | 0.0033 | 0.4 |
| Comparative Examples 12 | PVB-1 | GT8 | 42 | 0 | 0 | 0.048 | PVB-3 | GT8 | 63 | 0.3 | 0.0047 | 0.0 |
| Comparative Examples 13 | PVB-1 | GT8 | 42 | 0.1 | 0.0024 | 0.048 | PVB-3 | GT8 | 63 | 0.3 | 0.0047 | 0.5 |

*2: a numerical value represents the addition amount (parts by mass) with respect to 100 parts by mass of polyvinyl acetal (A)
*3: a numerical value represents the addition amount (parts by mass) with respect to 100 parts by mass of polyvinyl acetal (B)
*4: mass ratio of dispersant (Ad)/plasticizer (Ap): mass ratio A, mass ratio of dispersant (Bd)/plasticizer (Bp): mass ratio B,
4G8: tetraethylene glycol di-2-ethylhexanoate
3G9: triethylene glycol dinonanoate
GT8: glycerin tri-2-ethylhexanoate

TABLE 5

| | time of humidity control | time of resistance to plasticizer bleeding when water content is high | hot water boiling test of laminated glass |
|---|---|---|---|
| Example 23 | 18 hours | 48 hours | absent |
| Example 24 | 18 hours | 48 hours | absent |
| Example 25 | 18 hours | 48 hours | slightly present |
| Example 26 | 18 hours | 48 hours | absent |
| Example 27 | 18 hours | 48 hours | absent |
| Example 28 | 18 hours | 48 hours | slightly present |
| Example 29 | 18 hours | 48 hours | absent |
| Example 30 | 18 hours | 48 hours | absent |
| Example 31 | 18 hours | 48 hours | slightly present |
| Comparative Examples 8 | 72 hours | 12 hours | absent |
| Comparative Examples 9 | 72 hours | 24 hours | absent |
| Comparative Examples 10 | 72 hours | 12 hours | absent |
| Comparative Examples 11 | 72 hours | 24 hours | absent |
| Comparative Examples 12 | 72 hours | 12 hours | absent |
| Comparative Examples 13 | 72 hours | 24 hours | absent |

As indicated in Examples and Comparative Examples, in the laminate of the present invention, even when the laminate is dried rapidly in an atmosphere of a low temperature and a low humidity after the water content thereof becomes high due to a high temperature and a high humidity, water or a plasticizer does not easily cause phase separation from a polyvinyl acetal in the laminate, and water or the plasticizer does not bleed between layers of the laminate.

A reason why the laminate of the present invention exhibits such characteristics is unclear, but is considered as follows. That is, when the water content of the laminate in which both the outermost layers are preferably the layers A is high, water moves from the layer B to the layer A with volatilization of water from the layer A due to the fact that a mass ratio of the content of the dispersant (Ad) with respect to the content of the plasticizer (Ap) in the layer A is larger than a mass ratio of the content of the dispersant (Bd) with respect to the content of the plasticizer (Bp) in the layer B. As a result, the content of the layer B is also reduced before phase separation or bleeding occurs.

INDUSTRIAL APPLICABILITY

In the laminate of the present invention, a plasticizer included in the laminate is not easily extracted with water and does not easily volatilize, water or the plasticizer does not easily cause phase separation from a polyvinyl acetal, and water or the plasticizer does not easily bleed between layers even when the laminate having a high water content is rapidly dried in an atmosphere of a low temperature and a low humidity.

The invention claimed is:
1. A laminate, comprising:
a layer A comprising a polyvinyl acetal (A), a plasticizer (Ap), and a dispersant (Ad), and
a layer B comprising a polyvinyl acetal (B), a plasticizer (Bp), and optionally a dispersant (Bd),
wherein:
a mass ratio of a content of the dispersant (Ad) with respect to a content of the plasticizer (Ap) in the layer A is larger than a mass ratio of a content of the dispersant (Bd) with respect to a content of the plasticizer (Bp) in the layer B, the plasticizer (Ap) is an ester compound having a chemical structure obtained by an esterification reaction of one molecule of an m-valent alcohol, where m represents a natural number of 2 to 4, with m molecules of a monovalent carboxylic acid having 8 to 16 carbon atoms, the dispersant (Ad) has a chemical structure obtained by hydrolyzing at least one ester bond of the plasticizer (Ap), and has (m−1) to 1 hydroxy groups and 1 to (m−1) ester bonds, the plasticizer (Bp) is an ester compound having a chemical structure obtained by an esterification reaction of one molecule of an n-valent alcohol, where n represents a natural number of 2 to 4, with n molecules of a monovalent carboxylic acid having 8 to 16 carbon atoms, and the dispersant (Bd) has a chemical structure obtained by hydrolyzing at least one ester bond of the plasticizer (Bp), and has (n−1) to 1 hydroxy groups and 1 to (n−1) ester bonds.

2. The laminate according to claim 1, wherein the m-valent alcohol is a condensate of ethylene glycol having a condensation degree of 3 to 20.

3. The laminate according to claim 1, wherein the n-valent alcohol is a condensate of ethylene glycol having a condensation degree of 3 to 20.

4. The laminate according to claim 1, wherein an average amount of a residual hydroxy group of the polyvinyl acetal (A) is from 20 to 40 mol %.

5. The laminate according to claim 1, wherein an average amount of a residual hydroxy group of the polyvinyl acetal (B) is from 10 to 35 mol %, and an average amount of a residual vinyl ester group is from 0.01 to 25 mol %.

6. The laminate according to claim 1, wherein the content of the plasticizer (Ap) with respect to 100 parts by mass of the polyvinyl acetal (A) in the layer A is less than the content of the plasticizer (Bp) with respect to 100 parts by mass of the polyvinyl acetal (B) in the layer B.

7. The laminate according to claim 1, wherein the content of the plasticizer (Ap) in the layer A is from 20 to 60 parts by mass with respect to 100 parts by mass of the polyvinyl acetal (A).

8. The laminate according to claim 1, wherein the content of the plasticizer (Bp) in the layer B is from 30 to 80 parts by mass with respect to 100 parts by mass of the polyvinyl acetal (B).

9. The laminate according to claim 1, wherein in the monovalent carboxylic acid, at least two organic groups other than a carbonyl group are bonded to a carbon atom adjacent to a carboxyl group.

10. The laminate according to claim 1, comprising:
three or more layers,
wherein at least one of the two outer layers of the laminate is the layer A.

11. A laminated glass, comprising:
the laminate according to claim 1.

12. The laminate according to claim 10, wherein both of the two outer layers of the laminate are the layer A.

13. The laminate according to claim 1, wherein the layer B comprises the dispersant (Bd).

14. The laminate according to claim 1, wherein an average amount of residual hydroxyl group of the polyvinyl acetal (A) is more than an average amount of residual hydroxyl group of the polyvinyl acetal (B) by 3 to 20 mol %.

15. The laminate according to claim 1, wherein the plasticizer (Ap) is the same as the plasticizer (Bp).

16. The laminate according to claim 1, wherein the plasticizer (Ap) is different from the plasticizer (Bp).

17. The laminate according to claim 1, wherein the content of the dispersant (Ad) in the layer A is from 0.01 to 6 parts by mass with respect to 100 parts by mass of the polyvinyl acetal (A).

18. The laminate according to claim 13, wherein the content of the dispersant (Bd) in the layer B is from 0.01 to 4 parts by mass with respect to 100 parts by mass of the polyvinyl acetal (B).

19. The laminate according to claim 13, wherein the mass ratio of the content of the dispersant (Ad) with respect to the content of the plasticizer (Ap) in the layer A is 1.05 times or more as large as the mass ratio of the content of the dispersant (Bd) with respect to the content of the plasticizer (Bp) in the layer B.

* * * * *